(12) United States Patent
Arnold et al.

(10) Patent No.: US 8,238,967 B1
(45) Date of Patent: Aug. 7, 2012

(54) CONTROLLING A WIRELESS DEVICE WITH A WIRELESS HEADSET

(75) Inventors: Thomas A. Arnold, Carlsbad, CA (US); Glen Allen Oross, San Diego, CA (US); Mark Lieberman, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 749 days.

(21) Appl. No.: 11/773,230

(22) Filed: Jul. 3, 2007

(51) Int. Cl.
    *H04M 1/00* (2006.01)
(52) U.S. Cl. .................. 455/556.1; 455/573; 455/575.1
(58) Field of Classification Search .................. 455/574, 455/73, 41.2, 51.3, 556.1, 550.1, 556.2, 557, 455/564, 566, 569.1, 90.3, 552.1, 553.1, 455/573, 575.1–575.9, 151.2, 342–350; 704/275; 345/156–184; 381/370, 306, 109, 308; 361/600, 361/608, 616, 617, 667, 679.03, 679.27, 361/679.3, 679.38, 679.41, 724–727, 730, 361/731
    See application file for complete search history.

(56) References Cited

U.S. PATENT DOCUMENTS

| | | | |
|---|---|---|---|
| 7,130,654 B2 * | 10/2006 | Cho ............................ | 455/550.1 |
| 7,327,981 B2 * | 2/2008 | Hundal ........................ | 455/41.2 |
| 7,652,660 B2 * | 1/2010 | Chen et al. ................... | 345/156 |
| 2004/0137967 A1 * | 7/2004 | Bodley ........................ | 455/575.2 |
| 2005/0107131 A1 * | 5/2005 | Abramov ..................... | 455/569.1 |
| 2005/0245292 A1 * | 11/2005 | Bennett et al. ................ | 455/574 |
| 2006/0062400 A1 * | 3/2006 | Chia-Chun ..................... | 381/74 |
| 2006/0284787 A1 * | 12/2006 | Bear et al. ...................... | 345/1.1 |
| 2007/0135185 A1 * | 6/2007 | Dvorak et al. ................ | 455/575.2 |
| 2008/0032664 A1 * | 2/2008 | Chou et al. .................... | 455/348 |
| 2008/0132168 A1 * | 6/2008 | Segev et al. ................... | 455/41.2 |

OTHER PUBLICATIONS

Jabra: "User Manual of Bluetooth Headset Jabra BT 800", 2004.*
Stereo Bluetooth Headset HBH-DS970 Manual by Sony Ericsson, 2006.*
Jabra BT8010 Bluetooth headset User manual, 2006.*
Kyocera User Guide for Wireless Headset with LED Display, 2006.*
Internet Document: "Jabra BT 800 Bluetooth Headset" User Manual at http://www.jabra.com/NR/rdonlyres/5FF97899-9982-405F-B863-7D1F972D7C36/0/5000045800_BT800_UM_USA_RevD.pdf (accessed Feb. 20, 2004).
Internet Document: "LG Style-i Bluetooth Remote Unit" Product Review at http://www.mobilebee.com/LG-Style-i-Bluetooth-Remote-Unit.html (accessed Feb. 20, 2007).

* cited by examiner

*Primary Examiner* — Jinsong Hu
*Assistant Examiner* — San Htun

(57) ABSTRACT

A wireless communication apparatus that comprises a wireless device and a wireless headset is described. Additionally, a method for controlling the operations of a wireless communications apparatus is also described. The wireless device is configured to communicate with at least one remote base station using at least one communication standard. The wireless device is configured to perform at least one local application by locally processing computer instructions. The wireless headset is communicatively coupled to the wireless device and comprises a headset communications module, a headset selection means, and a headset display. The headset wireless communications module is configured to wirelessly communicate with the wireless device. The headset scrolling wheel is configured to control the local application on the wireless device from the headset. The headset display is configured to present a synchronized output that is synchronized with the local application that is executed on the wireless device.

12 Claims, 5 Drawing Sheets

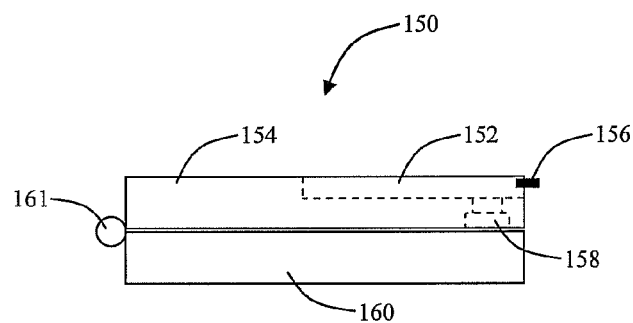
Figure 3A
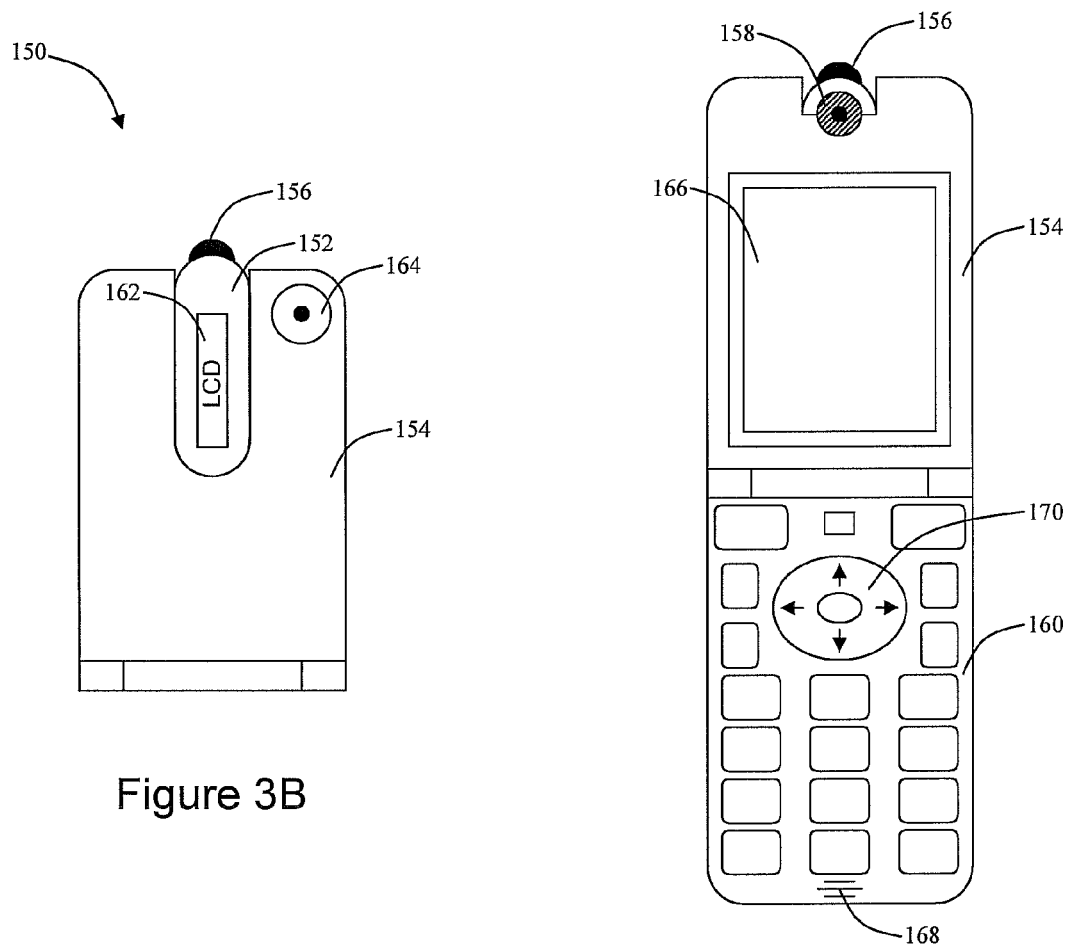
Figure 3B
Figure 3C

CONTROLLING A WIRELESS DEVICE WITH A WIRELESS HEADSET

FIELD OF THE INVENTION

This invention relates to controlling a wireless device with a wireless headset. More particularly, the invention relates to controlling a local application running on the wireless device with the wireless headset, and synchronizing the headset display output with a wireless device display.

BACKGROUND

Headsets are commonly used to interface with electronic devices. There are two kinds of headsets, namely, wired and wireless. Wired headsets are affordable, small and light. Wireless headsets are typically more costly and larger because a separate battery and additional electronics are employed. Generally, the wireless headset is communicatively coupled to a wireless device such as wireless telephone or mobile phone.

There are a variety of different wireless headsets and currently the headsets generally rely on Bluetooth technology, which is a wireless Personal Area Network technology. A Personal Area Network (PAN) is a computer network that includes telephones, personal computers, headsets, and personal digital assistants that are in relatively close proximity to one another. The devices may or may not belong to the person in question. The reach of a PAN is typically around ten meters. A PAN may be used for communication between personal electronic devices or for connecting to a higher level network such as the Internet. Personal area networks may be wired with computer buses such as Universal Serial Bus (USB) and FireWire. A wireless personal area network (WPAN) can also be made possible with network standards such as Infrared Data Association (IrDA), Ultra-Wideband (UWB), and Bluetooth.

One reason for using wireless headsets rather than wired headsets include not being tied to the wireless device, e.g. mobile phone, so the wireless headset can be used for driving. Recent hands-free legislation further promotes the transition from tangle-prone wired headsets to wireless headset. Wireless headsets are commonly referred to as "Bluetooth headsets" and offer a convenient and user friendly wireless connection between the headset and a Bluetooth-enabled wireless device. Additionally, a Bluetooth headset can also be used to connect with other devices such as a computer, so a Bluetooth headset could be used for teleconferencing with a PC and also with a mobile phone. Thus, one headset can be used with a variety of different Bluetooth enabled devices.

However, there are a variety of problems associated with wireless headsets. One such problem is that wireless headsets are powered by a separate battery and are generally turned on and off to preserve power; so the wireless headset is inconvenient to charge and can not be used during the charging process. Additionally, the typical wireless headset consists of a headphone and microphone, so that the headset is only used during voice communications.

SUMMARY

A wireless communication apparatus that comprises a wireless device and a wireless headset is described. The wireless device is configured to communicate with at least one remote base station using at least one communication standard. The wireless device is configured to perform at least one local application by locally processing computer instructions. The wireless headset is communicatively coupled to the wireless device and comprises a headset communications module, a headset scrolling wheel, and a headset display. The headset wireless communications module is configured to wirelessly communicate with the wireless device. The headset scrolling wheel is configured to control the local application on the wireless device from the headset. The headset display is configured to present a synchronized output that is synchronized with the local application that is executed on the wireless device. In one illustrative embodiment, the wireless headset is releasably coupled to the wireless device, and comprises a headset selection means that is configured to control the local application on the wireless device from the headset.

A method for controlling the operations of a wireless communications apparatus is also described. The method comprises releasably coupling a wireless headset to a wireless device. The wireless headset comprises a speaker that communicates audio signals when the wireless headset is coupled to the wireless device and when the wireless headset is separated from the wireless device. The method then proceeds to locally process computer instructions for at least one local application on the wireless device. The wireless device is configured to communicate with at least one remote base station using at least one communication standard. The wireless headset is configured to control the local application running on the wireless device. The wireless headset comprises a headset wireless communications module that is configured to communicate computer instructions generated by a headset selection means that controls the local application on the wireless device. A synchronized output is displayed on the headset display. The synchronized output is synchronized with the local application that is executed on the wireless device.

BRIEF DESCRIPTION OF THE DRAWINGS

The present invention can be more fully understood by reference to the following drawings that are provided for illustrative, not limiting, purposes.

FIGS. 3A, 3B and 3C shows an illustrative wireless device having a wireless headset docked on the wireless device.

DETAILED DESCRIPTION

Persons of ordinary skill in the art will realize that the following description is illustrative and not in any way limiting. Other embodiments of the claimed subject matter will readily suggest themselves to skilled persons having the benefit of this disclosure. It shall be appreciated by those of ordinary skill in the art that the apparatus and devices described hereinafter may vary as to configuration and as to details. Additionally, the methods may vary as to details, order of the actions, or other variations without departing from the illustrative method disclosed herein.

The wireless communication apparatus and method described herein comprises a wireless headset that can be used to control the local applications running on a wireless device. Additionally, the docking of the wireless handset in the wireless device permits the same speaker to be used when the wireless headset is separated from the wireless device, and when the wireless headset is coupled to the wireless device. A variety of local applications such as a contacts list application, a music storage application, and other such applications are described, in which the wireless headset can be used to control the application.

Figure 1:
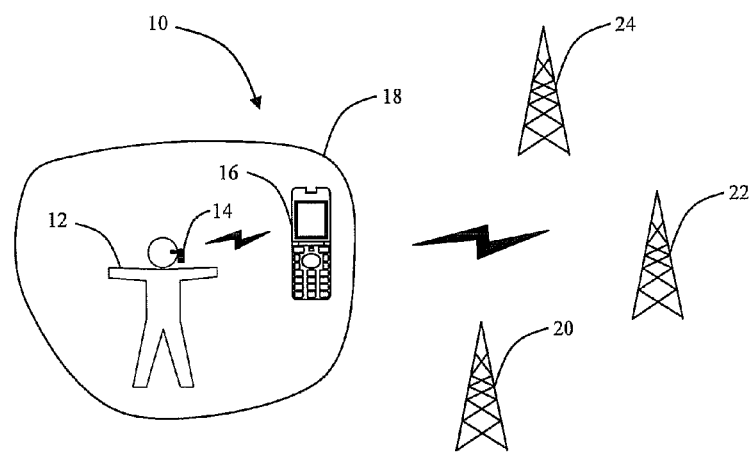
FIG. 1 shows an illustrative multimode wireless communication apparatus configured to communicate with a base station.

Referring to FIG. 1 there is shown an illustrative multimode wireless communication apparatus that is configured to communicate with a base station. The illustrative multimode wireless apparatus comprises a wireless device and a wireless handset operating in the communication system 10. A user 12 activates a wireless headset 14 to communicate wirelessly with a wireless device 16. In the illustrative example, the headset 14 communicates with the wireless device 16 within a Personal Area Network (PAN) radius 18 using a communication standard such as Bluetooth, or a local wireless technology such as a wireless local area network that uses Wi-Fi technology. By way of example and not of limitation, a 30 foot radius of coverage may be provided by a PAN technology such as Bluetooth. The PAN may also be wired and operate with USB and FireWire devices. The wireless PAN may include IrDA, UWB, Bluetooth, and other such wireless PAN technologies.

By way of example and not of limitation, the illustrative wireless device 16 is a wireless handset that may also be referred to as a mobile handset, mobile phone, wireless phone, portable cell phone, cellular phone, portable phone, a personal digital assistant (PDA), or any type of mobile terminal which is regularly carried by a user and has all the elements necessary for operation in the wireless communication system 10. However, it shall be appreciated by those of ordinary skill in the art having the benefit of this disclosure that the wireless device may be embodied in a home phone, a music player, a personal computer, a mobile phone, and any other such electronic device that can communicate wirelessly with headset. Thus, the illustrative wireless handset is provided for illustrative purposes only.

The illustrative wireless device 16 is a multimode wireless handset configured to communicate using a plurality of different wide area communication standards. In the illustrative system 10, the wireless device is a wireless handset 16 that is configured to communicate with one or more base stations 20, 22 and 24 using different wide area communication access technologies (CATs). The illustrative base stations may communicate with the wireless handset using a variety of different communication standards including, but not limited to, various forms of code division multiple access (CDMA) and time division multiple access (TDMA) wireless interfaces. By way of example and not of limitation, the wireless handset 16 communicates with base station 20 using a CAT that operates using CDMA technology at 1.9 GHz. The wireless handset 16 is also configured to communicate with base station 22 using a CAT that operates using CDMA at 800 MHz. Additionally, the illustrative handset 16 is configured to communicate with base station 24 using a CAT that operates using GSM technology at 900 MHz. Those skilled in the art shall appreciate that other wide area CAT technologies include Wi-Fi, WiMAX, and other such communication technologies.

Figure 2:
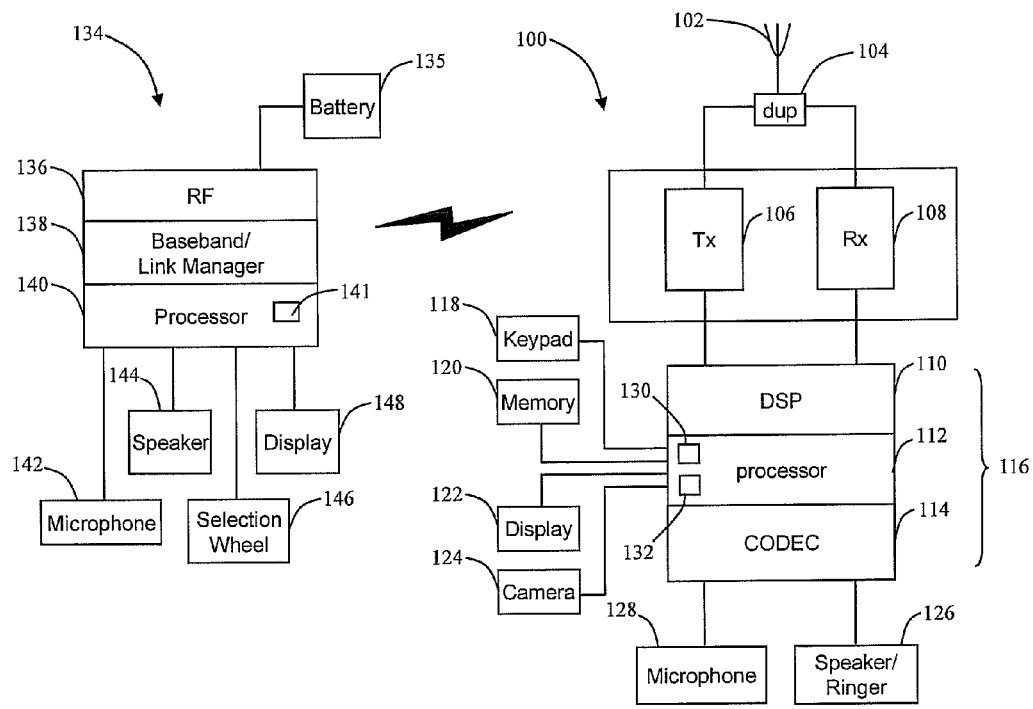
FIG. 2 shows a block diagram of an illustrative wireless device and an illustrative wireless headset.

Referring to FIG. 2 there is shown a block diagram of an illustrative wireless device and a wireless headset. The illustrative wireless device is a multimode wireless handset 100 that is configured to communicate using a plurality of different communication standards including PAN communications standards and wide area communication standards as generally described above. The illustrative multimode wireless handset 100 comprises a first antenna element 102 that is operatively coupled to a duplexer or diplexer 104, which is operatively coupled to a multimode transmitter module 106 and a multimode receiver module 108. The illustrative multimode transmitter module 106 and multimode receiver module 108 each comprise a plurality of transmitter modules and receiver modules that communicate using separate communication technologies such as Bluetooth and CDMA.

An illustrative control module 116 comprises a digital signal processor (DSP) 110, a processor 112, and a CODEC 114 that are communicatively coupled to the transmitter module 106 and receiver module 108. The DSP 110 may be configured to perform a variety of operations such as controlling the antenna 102, the multimode transmitter module 106 and the multimode receiver module 108. The processor 112 is operatively coupled to a keypad 118, a memory 120, a display 122, and a camera 124. Additionally, the processor 112 is also operatively coupled to the CODEC module 114 that performs the encoding and decoding operations and is communicative coupled to a speaker or ringer 126 and a microphone 128.

The illustrative wireless handset 100 may be built as a light weight and small device adapted to be portable and may be conveniently carried around by a user. The wireless handset 100 is further adapted for caller operation and is enabled to permit a user to manually input data with the keypad 118 that may be a normal key pad, such as key pad for a cell phone or a PDA, and may additionally include specific input keys, such as a scrolling means or the like, to input particular information or to perform particular selection functions. Input data or requests may be taken from voice information that are received from microphone 128 or a combination of voice information and DTMF signals. The memory module 120 may be used for storing input data or storing programming information that is pre-loaded on the wireless handset 100, or that has been downloaded to the wireless handset 100. The memory module 120 may be capable of storing relatively large files including audio files and video files.

In operation, the wireless device 100 is configured to perform at least one local application by locally processing computer instructions using the resources of inter alia the processor 112 and memory 120. For example, one local application may be a contacts list application 130, in which the contacts list is stored on the memory 120 that can be controlled and viewed on the display 122 of the wireless device 100. Another local application may be a music application 132 that stores a variety of different audio files on the memory 120. Yet another application may be a camera application that captures images and video with camera 124.

A wireless headset 134 is configured to communicate wirelessly with the wireless handset 100 with a headset communications module. By way of example and not of limitation, the headset communications module is a Bluetooth communications module that is housed within the wireless headset 134, which may also be referred to as a "Bluetooth headset." In the illustrative embodiment, a Bluetooth headset may be audio enabled or voice enabled. It shall be appreciated by those of ordinary skill in the art that there are a variety of different Bluetooth design implementations.

The illustrative wireless headset 134 comprises a battery 135 and a radio 136 that converts the digital baseband data to and from a 2.4 GHz analog signal using Gaussian Frequency Shift Keying (GFSK) modulation. The battery 135 is charged when the wireless headset is proximate to the wireless device 100. By way of example, there are at least two approaches for charging the battery, namely, having the headset 134 come into direct contact with recharging contacts (not shown) on the wireless device 100, or by inductively charging the battery 135 when the headset 134 is in close proximity to wireless device 100.

The Bluetooth headset 134 also comprises a baseband link controller 138 which manages the core Bluetooth processes that constructs and decodes packets, encodes and manages error correction, encrypts and decrypts, controls, and other such operations. The baseband link controller 138 also creates the links, monitors the health of the links, and terminates the links gracefully.

A processor 140 also runs higher levels of the Bluetooth protocol stack and performs functions that relate to the logical link control and adaptation protocol that determines the connections for the device, the level of performance, and encryption. The logical link control and adaptation protocol is implemented in software. The processor 140 may include a memory module 141 that is used to store computer instructions and/or data. Generally, the memory 141 is relatively small and accesses the information stored on the larger memory 120 resident in the wireless device 100. Alternatively, the memory 141 could be made substantially larger to minimize access to resources on device 100, but this is expected to increase the size of the headset 134.

The computer instructions for applications controlled by the headset are processed by the processor 140. The wireless headset applications include using a microphone 142 and speaker 144 for voice calls. In the illustrative embodiment described in further detail below, the headset speaker 144 is configured to generate audio signals when the wireless headset 135 is physically coupled to the wireless device 100, and when the wireless headset 134 is separated from the wireless device 100. A selection means such as a selection wheel 146, scrolling wheel, or jog dial is configured to control one or more local applications running on the wireless device from the headset 134. A display 148 is also coupled to the processor 140 and is configured to present a synchronized output that is synchronized with the local applications that are executed on the wireless device 100. By having a synchronized interface operations such as scrolling on the wireless headset 134 results in scrolling on the device display 122, so the headset 134 remotely controls the operations performed by the wireless device 100.

A plurality of applications can be run on the wireless device 100 and controlled by the wireless headset 134 described herein. The applications described herein overcome software conflicts that prevent the headset from controlling applications running on the wireless device 100 because the headset 134 is configured to access the device resources, the wireless device software, and memory that is stored on the wireless device 100. The headset 134 may be configured to access applications that include, but are not limited to, the contacts list, audio files, picture files, video files, and controlling the device camera 124. Thus, the headset 134 and the wireless device 100 are synchronized so that applications can be directly controlled from the illustrative selection wheel 146 associated with the headset 124.

For example, the wireless headset 134 is configured to control a contacts list application 130 that is stored on the wireless device 100. The contacts list is displayed on the headset display 148 and the selection wheel 146 controls the selection of a contact. The selection wheel 146 is also configured to communicate an instruction that initiates a voice call to the selected contact.

Additionally, the local application may be an audio/visual application or "music" application 132 that comprises a plurality of audio files that are stored on the wireless device 100. By way of example and not of limitation, a title for each corresponding audio file is displayed on the headset display 148 and the headset selection wheel 146 is configured to control the selection of the audio file.

In yet another application, the camera 124 on the wireless device 100 is controlled by the selection wheel 146 disposed on the headset 134. Thus, the selection wheel 146 is used to turn the camera on and off for pictures and videos. Additional local applications running on the wireless device 100 that are controlled by the selection wheel 146 on headset 134 should readily suggest themselves to those of ordinary skill in the art.

Referring to FIGS. 3A, 3B and 3C there is shown an illustrative wireless device having a wireless headset docked on the wireless device. FIG. 3A provides a side view of an illustrative wireless communication apparatus 150 that is a mobile phone as described above. The wireless communication apparatus 150 comprises a clam shell housing that is in a closed state. The wireless headset 152 is releasably coupled to a flip housing portion 154. It shall be appreciated by those of ordinary skill in the art having the benefit of this disclosure that the wireless communication apparatus 150 may be configured as a bar handset, a "slider" handset, any other such articulating handset, or any handset having a speaker component.

The wireless headset 152 includes a selection means 156 and a speaker 158 that faces a base housing portion 160, when the clam shell housing is closed. The clam shell housing comprises the flip housing portion 154 that is movably coupled to a base housing portion 160 along a pivot 161.

The headset speaker 158 is configured to generated audio signals when the clam shell housing is open and when the wireless headset is separated from the wireless. Additionally, the illustrative headset speaker 158 is configured to replace a static earpiece with an earpiece that can be used when the wireless headset 152 is docked in the wireless communication apparatus 150 and when the wireless headset 152 is separated from the flip housing portion 154.

Referring to FIG. 3B there is shown a view of the outer face of the flip housing portion 154, when the wireless communication apparatus 150 is in a closed state. Additionally, the wireless headset 152 comprises an LCD display 162 that is visible when the wireless headset 150 is closed. The flip housing portion 154 also comprises a camera lens aperture 164 that is used to capture images and videos.

Referring to FIG. 3C there is shown the wireless communication apparatus 150 in an open state. In the open state, a display 166 on the flip housing portion 154 is visible. A microphone 168 and a navigation key 170 are both located in the base housing portion 160. The navigation key 170 is configured to permit a user to move a cursor vertically, horizontally, and to use the center navigation key to make a selection.

The LCD display 162 is configured to display Caller ID data, contact list information, selected contact information, audio file information, messages, and other such data or information that is displayed on the handset display 166. The LCD display 162 is functionally smaller than the device display 166.

The selection means 156 may be a jog dial, scrolling wheel, or other such selection means having a small footprint that can fit on the wireless headset 152. In one embodiment, the selections means 156 is a scrolling wheel that permits the user to scroll up and down and hear "clicks" during the scrolling process. Additionally, the scrolling wheel permits a user to push the scrolling wheel forward to select a particular operation. The illustrative jog dial operates in a manner similar to the scrolling wheel, except the jog does not click during the scrolling process. The selection means 156 performs operations that are similar to the navigation key 170, thus the selection means 156 may also be configured to scroll sideways, i.e. horizontally, and also up and down, i.e. vertically.

Figures 4A, 4B, 4C:
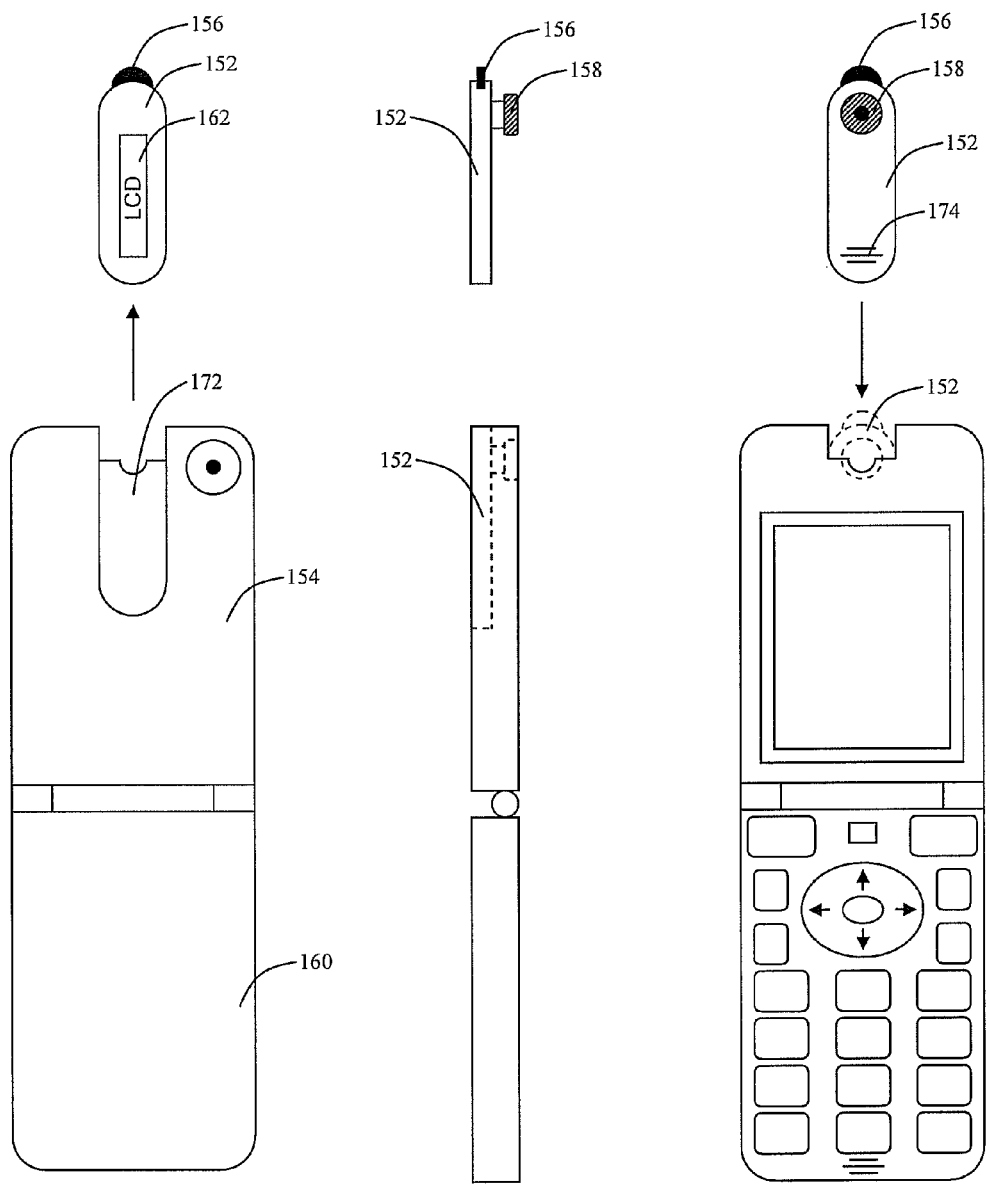
FIGS. 4A, 4B, and 4C shows the illustrative headset separated from the wireless device.

Referring to FIGS. 4A, 4B, and 4C there is shown the illustrative headset 152 separated from the flip housing portion 154 of the wireless communication apparatus. In FIG. 4A, the outer shell of the wireless communication apparatus is shown. The wireless headset 152 is removed from a slot 172 that is located on the flip housing portion 154. While the wireless headset 152 is releasably coupled to the flip housing portion 154, the headset battery is charged. After the wireless headset 152 is removed from the slot 172, the headset battery powers the operations headset 152.

In FIG. 4B, there is shown the side view of the wireless communication apparatus and the headset 152. The headset speaker 158 is configured as an earpiece that fits comfortably into a user's ear. The selection means 156 provides functions that are similar to the navigation key 170 described above.

FIG. 4C displays the interior of the open wireless communication apparatus. The wireless headset 152 comprises the headset speaker 158 that can be used to communicate audio signals when the wireless headset 152 is coupled to the flip housing portion 154 and when the wireless headset 152 is separated from the flip housing portion 154. Additionally, a microphone 174 is also located on the wireless headset 152.

Figure 5:
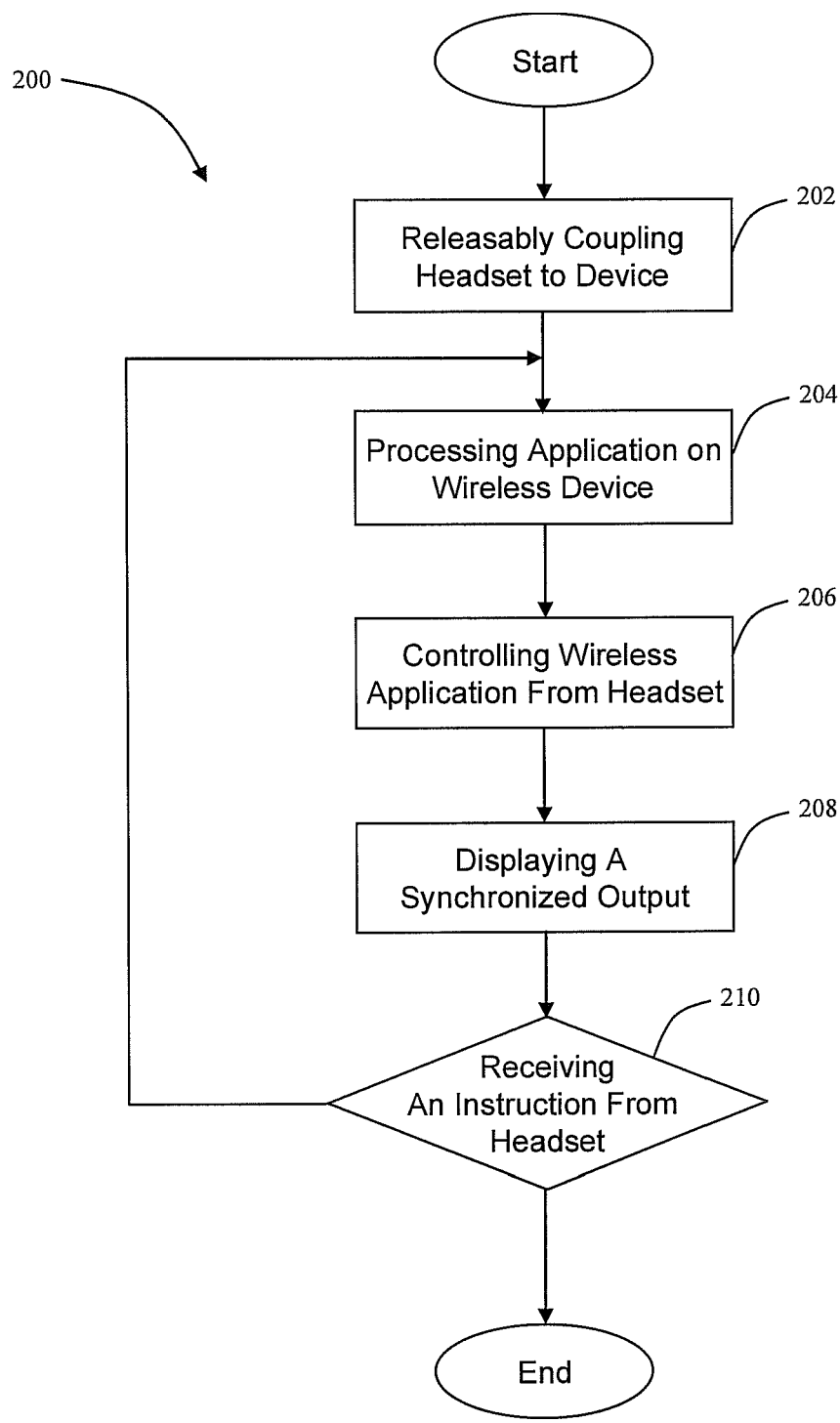
FIG. 5 shows an illustrative flowchart of a method for controlling the operations of the wireless device with the wireless headset.

Referring to FIG. 5 there is shown an illustrative flowchart of a method for controlling the operations of the wireless device with the wireless headset. The method comprises releasably coupling the wireless headset to the wireless device at block 202. As described above, the illustrative wireless headset comprises a speaker that communicates audio signals when the wireless headset is coupled to the wireless device and when the wireless headset is separated from the wireless device. Additionally, the wireless device is configured to communicate with at least one remote base station using at least one communication standard.

At block 204, the method proceeds to locally process computer instructions for at least one local application on the wireless device. One such local application includes a contacts list application the stores a contacts list on the wireless device and displays the contacts list on the headset display and controls the selection of a contact with the headset selection means. The contacts list application may also be configured to initiate a voice call to the selected contact after receiving an instruction from the wireless handset to initiate the voice call. Another illustrative wireless application comprises a plurality of audio files stored on the wireless device, in which the headset display displays each title for each audio file and the headset selection means controls the selection of the audio file. Yet another illustrative wireless application includes remotely controlling a device camera disposed on the wireless device with the headset selection means.

At block 206, the wireless headset is configured to control the local application running on the wireless device. The wireless headset comprises a headset wireless communications module such as Bluetooth that is configured to communicate computer instructions generated by a headset selection means that controls the local application on the wireless device. At block 208, a synchronized out is displayed on the headset display. The synchronized output is synchronized with the local application that is executed on the wireless device, the local application displayed on the wireless device display, or any combination thereof.

The method then proceeds to decision diamond 210, where the wireless device waits to receive an instruction from the wireless headset. If an instruction is received from the wireless headset, the method returns to block 204 where the computer instruction is received by the local application that is being processed by the wireless device.

Figure 6A:
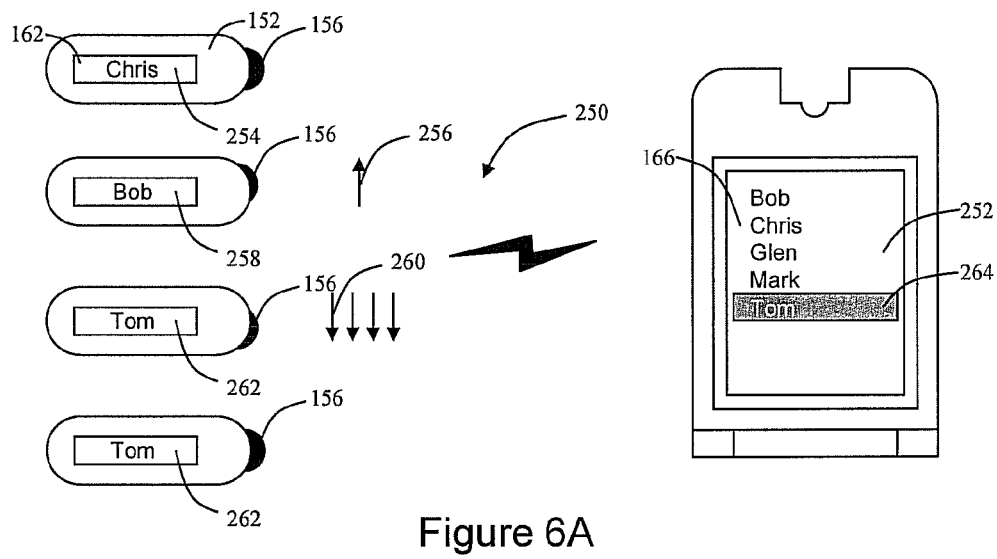
FIGS. 6A and 6B show illustrative screenshots of the wireless headset display and the wireless device display for a contacts list application.
Figure 6B:
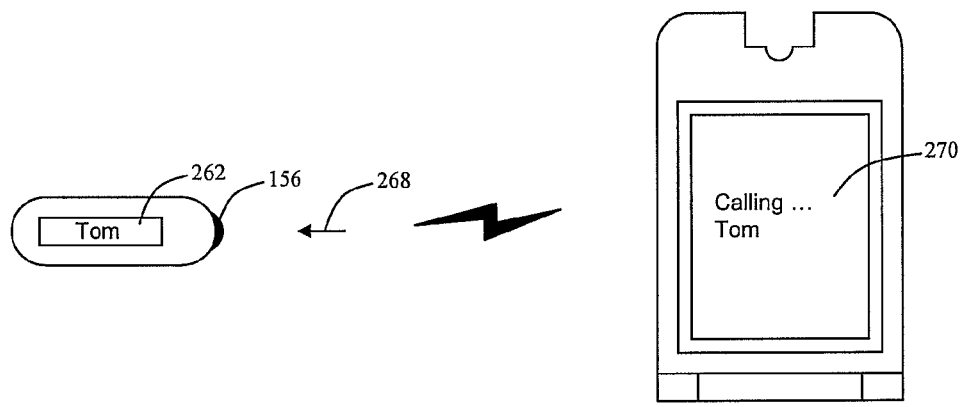

Referring to FIGS. 6A and 6B there is shown an illustrative screenshot of the wireless headset display and the wireless device display for a contacts list application. The contacts list application is configured to perform the entire call process from the headset 152. The contacts list application 250 runs on both the wireless device and the wireless headset 152. The contacts list application 250 stores the contacts list on the wireless device and displays the contacts list and on the device display 166.

In FIG. 6A a screenshot 252 of the contacts list is visible on the handset. In an illustrative example of the contacts list application described above, a call is received by the wireless communication apparatus from a contact stored in the contacts list. The contact name "Chris" is displayed on a screenshot 254 of the headset LCD display 162. In operation, the user may open the phone and remove the headset to speak, or the user can be wearing the headset and use either the headset selection means or handset keypad to receive the call.

Once the call is initiated, the user has the option of using either the headset for speaking and listening in a hands free mode, or using the same headset for listening when the headset is docked or coupled to the wireless device. The headset selection means 156 may be used to control the volume.

After the call is completed the user may decide to make another call, and may use the selection means 156 to select another contact in the contacts list. If the user moves the selection means 156 up one time 256, the next name that is displayed is "Bob" in screenshot 258. If the user moves the selection means 156 down four times the name "Tom" is displayed in screenshot 262. The wireless device display 166 is synchronized with the headset display 162, and the computer instructions from the selection means 156 are communicated to the wireless device so that a visual indication 264 for the name "Tom" is provided on the wireless device display.

Once the name "Tom" has been selected, either the headset or the wireless device awaits an instruction to initiate a voice call. In FIG. 6B, the instruction is provided by pushing in the selection means 156 as indicated by arrow 268. Subsequently, the wireless device display indicates that the wireless device is placing a call to "Tom" in screenshot 270. Thus, the contacts list application is configured to initiate a voice call to the selected contact after receiving an instruction from the wireless handset to initiate the voice call.

Figure 7:
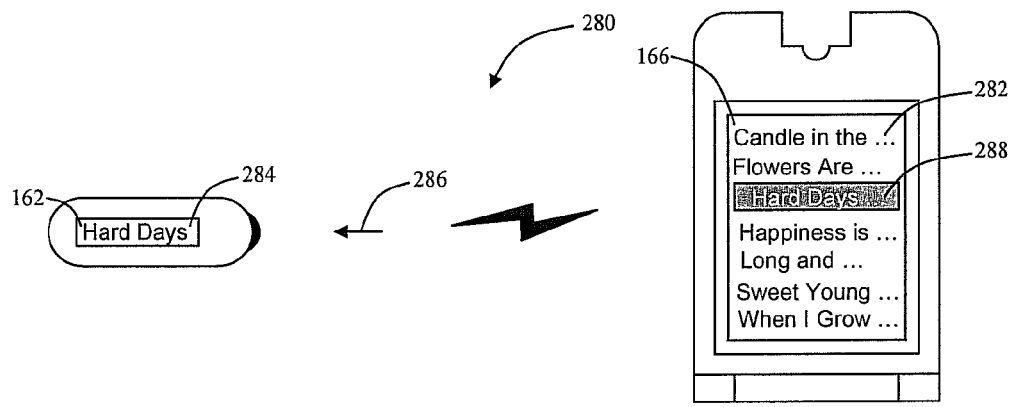
FIG. 7 shows illustrative screenshots of the wireless headset display and the wireless device display for an audio application.

Referring to FIG. 7 there is shown an illustrative screenshot of the wireless headset display and the wireless device display for an audio application. In screenshot 282 a list of songs is displayed on the wireless device display 166 and a portion of the song list is communicated to the wireless headset. In the illustrative example, the song "Hard Days . . . " is selected or is being played. The headset display 162 is synchronized with the device display 166 and the song list with same title is shown in screenshot 284. The user can also use the selection means 156 to control the selection of audio files by allowing the user to find audio files.

A variety of limitations are overcome with the wireless communications apparatus described above. The wireless headset can be used to provide a convenient apparatus and method that uses a wireless headset to control local applications that run on the wireless device. Additional benefits are also derived by docking the wireless handset in the wireless device that prevent the user from losing the wireless headset.

It is to be understood that the detailed description of illustrative embodiments are provided for illustrative purposes. The scope of the claims is not limited to these specific embodiments or examples. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A wireless communications apparatus, comprising:
a wireless device comprising a wireless device display, the wireless device configured to communicate with at least one remote base station using at least one communication standard, the wireless device configured to perform a plurality of local applications by locally processing computer instructions,
the plurality of local applications comprising:
a contacts list that is stored on the wireless device, and
a plurality of audio files that are stored on the wireless device; and
a wireless headset communicatively coupled to the wireless device, the wireless headset comprising,
a headset wireless communications module that is configured to communicate with the wireless device,
a headset scrolling wheel configured to control the plurality of local applications on the wireless device from the headset, wherein an input received from the headset scrolling wheel results in scrolling on the wireless device display,
a headset display configured to present a synchronized output that is synchronized with the local application that is executed on the wireless device;
wherein the contacts list is displayed on the headset display and the headset scrolling wheel controls the selection of a contact from the contacts list, wherein a selected contact is displayed simultaneously on the headset display and the wireless device display;
wherein each title for each audio file is displayed on the headset display and the headset scrolling wheel is configured to control the selection of the audio file, wherein a selected audio file is displayed simultaneously on the headset display and the wireless device display; and
wherein the wireless device comprises a clam shell housing having a flip housing portion and a base housing portion, and the wireless headset comprises a speaker that faces the base housing portion when the clam shell housing is closed, the speaker configured to generate audio signals when the clam shell housing is open and when the wireless headset is separated from the wireless device.

2. The wireless communication apparatus of claim 1 wherein the headset scrolling wheel is configured to communicate an instruction that initiates a voice call to the selected contact.

3. The wireless communication apparatus of claim 1 wherein the wireless device comprises a device camera disposed on the wireless device, the device camera configured to be remotely controlled with the headset scrolling wheel.

4. The wireless communication apparatus of claim 1 further comprising a headset speaker on the wireless headset, the headset speaker configured to generate audio signals when the wireless headset is coupled to the wireless device and when the wireless headset is separated from the wireless device.

5. The wireless communication apparatus of claim 1 further comprising a headset battery that is charged when the wireless headset is proximate to the wireless device.

6. A wireless communications apparatus, comprising:
a wireless device comprising a wireless device display, the wireless device configured to communicate with at least one remote base station using at least one communication standard, the wireless device configured to perform a plurality of local applications by locally processing computer instructions,
the plurality of local applications comprising:
a contacts list that is stored on the wireless device, and
a plurality of audio files that are stored on the wireless device; and
a wireless headset releasably coupled to the wireless device, the wireless headset comprising,
a headset wireless communications module that is configured to communicate with the wireless device,
a headset selection means configured to control the plurality of local applications on the wireless device from the headset, wherein an input received from the headset selection means results in scrolling on the wireless device display,
a headset display configured to present a synchronized output that is synchronized with the local application that is executed on the wireless device, and
a headset battery that is charged when the wireless headset is proximate to the wireless device;
wherein the contacts list is displayed on the headset display and the headset selection means controls the selection of a contact from the contacts list, wherein a selected contact is displayed simultaneously on the headset display and the wireless device display;
wherein each title for each audio file is displayed on the headset display and the headset selection means is configured to control the selection of the audio file, wherein a selected audio file is displayed simultaneously on the headset display and the wireless device display; and
wherein the wireless device comprises a clam shell housing having a flip housing portion and a base housing portion, and the wireless headset comprises a speaker that faces the base housing portion when the clam shell housing is closed, the speaker configured to generate audio signals when the clam shell housing is open and when the wireless headset is separated from the wireless device.

7. The wireless communication apparatus of claim 6 wherein the headset scrolling wheel is configured to communicate an instruction that initiates a voice call to the selected contact.

8. The wireless communication apparatus of claim 6 wherein the wireless device comprises a device camera disposed on the wireless device, the device camera configured to be remotely controlled with the headset selection means.

9. A method for controlling the operations of a wireless communications apparatus, the method comprising:
releasably coupling a wireless headset to a wireless device comprising a wireless device display, wherein the wireless headset comprises a speaker that communicates audio signals when the wireless headset is coupled to the wireless device and when the wireless headset is separated from the wireless device;
locally processing computer instructions for a plurality of local applications on the wireless device, the plurality of local applications comprising;
- a contacts list, wherein the wireless device is configured to communicate with at least one remote base station using at least one communication standard, and
- a plurality of audio files stored on the wireless device;
    storing a contacts list on the wireless device; controlling the local application running on the wireless device from the wireless headset, the controlling the plurality of local applications comprising:
- selection of a contact from the contacts list with a headset selection means, wherein a selected contact is displayed simultaneously on the headset display and the wireless device display, and
- selection of the audio file with the headset selection means, wherein a selected audio file is displayed simultaneously on the headset display and the wireless device display;
- wherein the wireless headset comprises a headset wireless communications module that is configured to communicate computer instructions generated by the headset selection means that controls the local application on the wireless device; and
- displaying a synchronized output on a headset display, the displayed synchronized output comprising a contacts list and each title for each audio file, in which the synchronized output is synchronized with the local application that is executed on the wireless device, wherein an input received from the headset selection means results in scrolling on the wireless device display; and
- wherein the wireless device comprises a clam shell housing having a flip housing portion and a base housing portion, and the wireless headset comprises a speaker that faces the base housing portion when the clam shell housing is closed and wherein the speaker generates audio signals when the clam shell housing is open and when the wireless headset is separated from the wireless device.

10. The method of claim 9 further comprises initiating a voice call to the selected contact after receiving an instruction from the wireless headset to initiate the voice call.

11. The method of claim 9 further comprising remotely controlling a device camera disposed on the wireless device with the headset selection means.

12. The method of claim 9 further comprising receiving an instruction from the wireless headset that controls the local application that is being processed by the wireless device.

* * * * *